United States Patent
Bayley et al.

(10) Patent No.: US 8,093,520 B2
(45) Date of Patent: Jan. 10, 2012

(54) RECONFIGURABLE SWITCH ARRAY USING MULTI-LAYERED FILM

(75) Inventors: James P. Bayley, Clarkston, MI (US); Frank Homann, Shelby Township, MI (US)

(73) Assignee: Continental Automotive Systems US, Inc., Auburn Hills, MI (US)

( * ) Notice: Subject to any disclaimer, the term of this patent is extended or adjusted under 35 U.S.C. 154(b) by 457 days.

(21) Appl. No.: 12/209,439

(22) Filed: Sep. 12, 2008

(65) Prior Publication Data
US 2009/0065336 A1    Mar. 12, 2009

Related U.S. Application Data

(60) Provisional application No. 60/993,436, filed on Sep. 12, 2007.

(51) Int. Cl.
*H01H 9/00* (2006.01)
(52) U.S. Cl. ........................... 200/313; 200/314
(58) Field of Classification Search .............. 200/313
See application file for complete search history.

(56) References Cited

U.S. PATENT DOCUMENTS

| | | | |
|---|---|---|---|
| 6,281,812 B1 | 8/2001 | Kim | |
| 7,319,426 B2 * | 1/2008 | Garfio | 341/176 |
| 7,747,006 B2 * | 6/2010 | Kim et al. | 379/434 |

FOREIGN PATENT DOCUMENTS

| | | |
|---|---|---|
| GB | 2408246 | 5/2005 |
| WO | 00/17900 | 3/2000 |
| WO | 2006/048627 | 5/2006 |

OTHER PUBLICATIONS

International Search Report and Written Opinion mailed Nov. 28, 2008.
International Preliminary Report on Patentability mailed on Mar. 25, 2010 for PCT/US2008/076103.

* cited by examiner

*Primary Examiner* — Elvin G Enad
*Assistant Examiner* — Lisa Klaus

(57) ABSTRACT

A switch panel assembly includes a plurality of selectively enabled switches for actuating only those available features. A plurality of available actuateable features are represented on the switch panel by graphics that are hidden in a non-illuminated condition and reveled when backlit. Each of individual switch and corresponding LED are selectively enabled and become visible and actuateable when those corresponding features are available to provide a single device operable without physical modification for many features assembled in many different combinations.

19 Claims, 3 Drawing Sheets

US 8,093,520 B2

RECONFIGURABLE SWITCH ARRAY USING MULTI-LAYERED FILM

CROSS REFERENCE TO RELATED APPLICATION

The application claims priority to U.S. Provisional Application No. 60/993,436 which was filed on Sep. 12, 2007.

BACKGROUND OF THE INVENTION

This disclosure generally relates to a switch panel for a vehicle. More particularly, this disclosure relates to a reconfigurable switch array that is selectively backlit to reveal available functions.

A switch panel for a motor vehicle includes an array of buttons or switches for a set number of functions, for example, auxillary features, radio controls, climate controls. These functions generally vary from vehicle to vehicle, requiring many physical variants of the switch array depending on the vehicle's options. The variants are traditionally created either by using separate, individual switches and "blanks" that are installed together into a holder in order to create the appropriate array, or by creating many variants of an integrated switch panel. In either case, the physical variants are tedious to manufacture, and result in high cost due to redundancy of electronics, mechanical content, and design efforts.

Accordingly, it is desirable to design and develop a reconfigurable switch array that provides the flexibility to create different switch configurations by changing software, while maintaining only one common variant of hardware.

SUMMARY OF THE INVENTION

A disclosed example switch panel assembly includes a plurality of selectively enabled switches for actuating those features available. A plurality of available actuateable features are represented on the switch panel by graphics that are hidden in a non-illuminated condition and revealed when backlit.

The example switch panel includes a support housing within which is supported a printed circuit board (PCB) having a plurality of light sources and switches. A multi-layer film assembly is supported over the PCB and includes a transparent plastic substrate that supports an opaque layer with the desired graphics that are visible when backlit.

The example switch panel includes switches and graphics that correspond with all possible available features. However, not all variants of a particular vehicle will include all of the available features. Therefore, the switch panel is selectively controlled to illuminate only those graphics that correspond to features available for that specific vehicle.

Accordingly, the example switch panel assembly provides a single device operable without physical modification to operate features assembled in many different combinations. Each of the individual switches and corresponding LEDs are selectively enabled and to become visible and actuateable according to the available features. The example switch panel assembly accordingly eliminates the need for differently configured switch panel assemblies for each available combination of features.

These and other features of the present invention can be best understood from the following specification and drawings, the following of which is a brief description.

DETAILED DESCRIPTION OF THE PREFERRED EMBODIMENT

Figure 1:
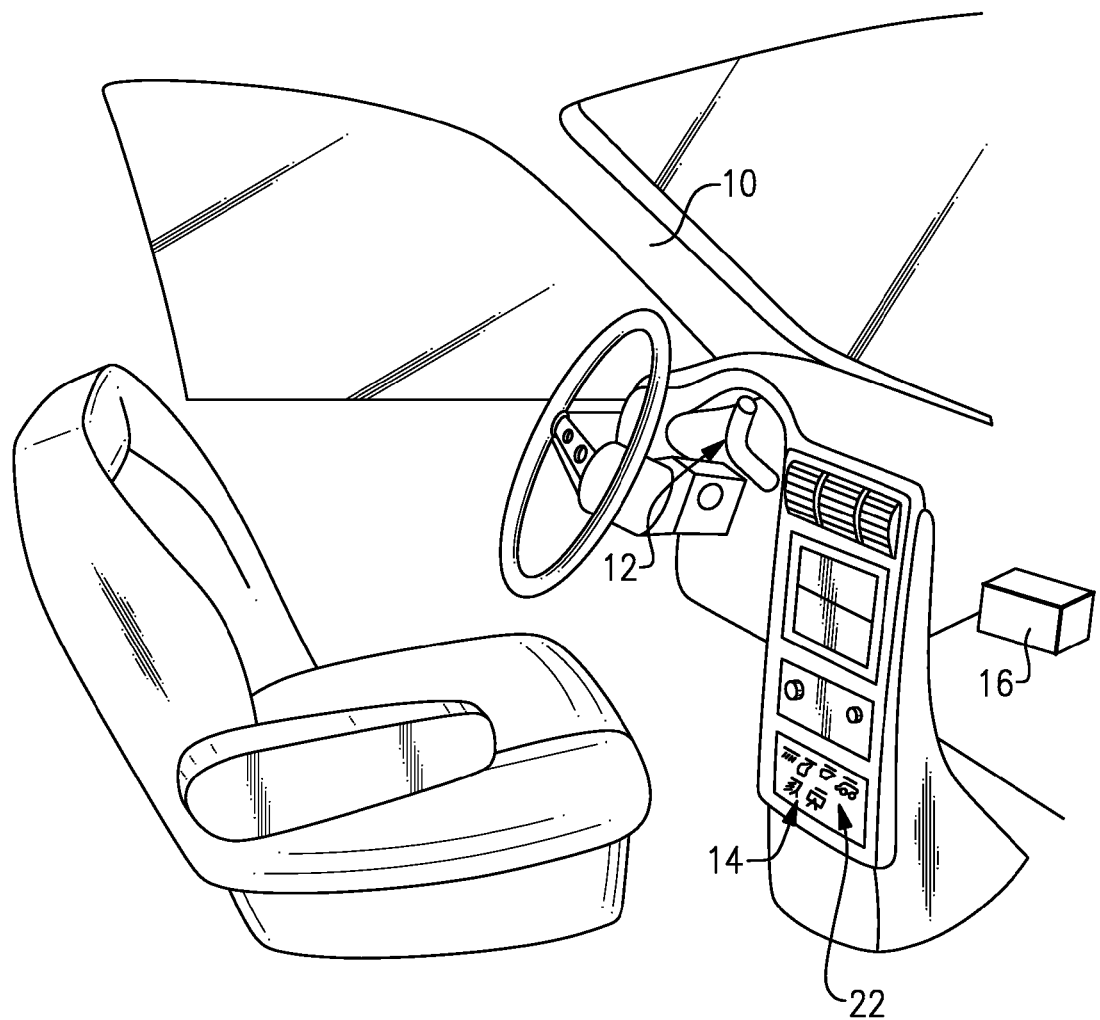
FIG. 1 is a schematic view of an interior compartment of a motor vehicle including an example switch panel.

Referring to FIG. 1, an example vehicle 10 includes an instrument panel 12 and a switch panel 14. The switch panel 14 communicates with a controller 16 to provide selective actuation of various vehicle features. A plurality of available actuateable features are represented on the switch panel 14 by graphics 22. The example switch panel 14 hides the graphics 22 when in a non-illuminated condition and reveals the various graphics 22 corresponding to the select vehicle features when backlit.

Figure 2:
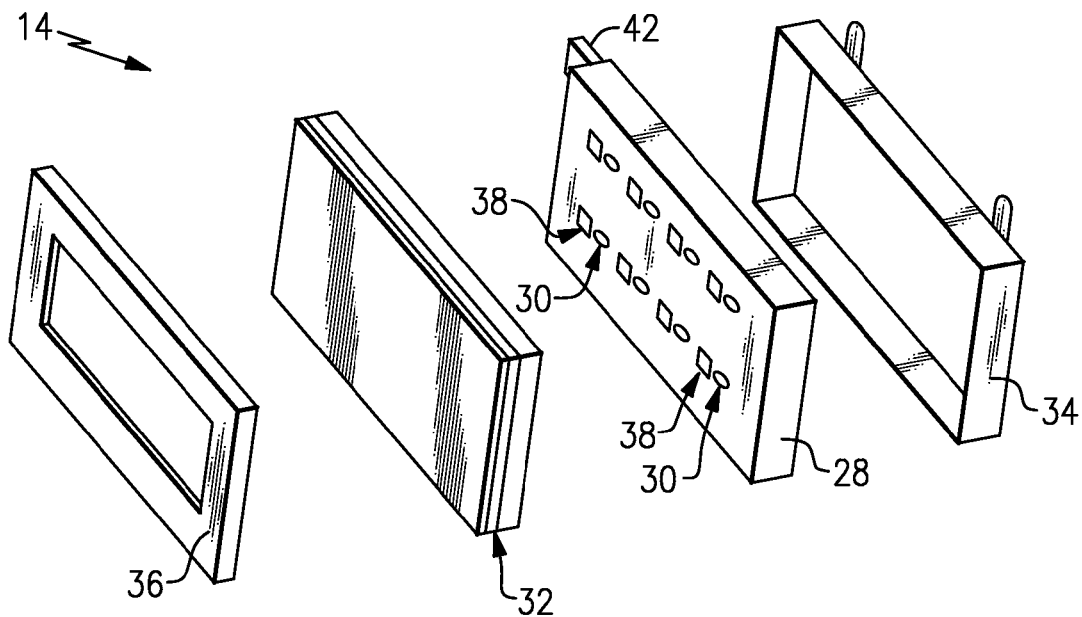
FIG. 2 is an exploded view of the example switch panel assembly.

Referring to FIG. 2, the example switch panel 14 includes a support housing 34 within which is supported a printed circuit board 28 (PCB) having a plurality of light emitting diodes 30 and switches 38. As appreciated, other light sources are also within the contemplation of this invention. A multi-layer film assembly 32 is supported over the PCB 28. The plurality of switches 38 are operable to actuate desired vehicle features. A bezel 36 is disposed over the multilayer film assembly 32 to hold the switch panel 14 together and provide a desired appearance corresponding to the vehicle interior. The PCB 28 includes connector 42 for communicating with the controller 16.

Figure 3:
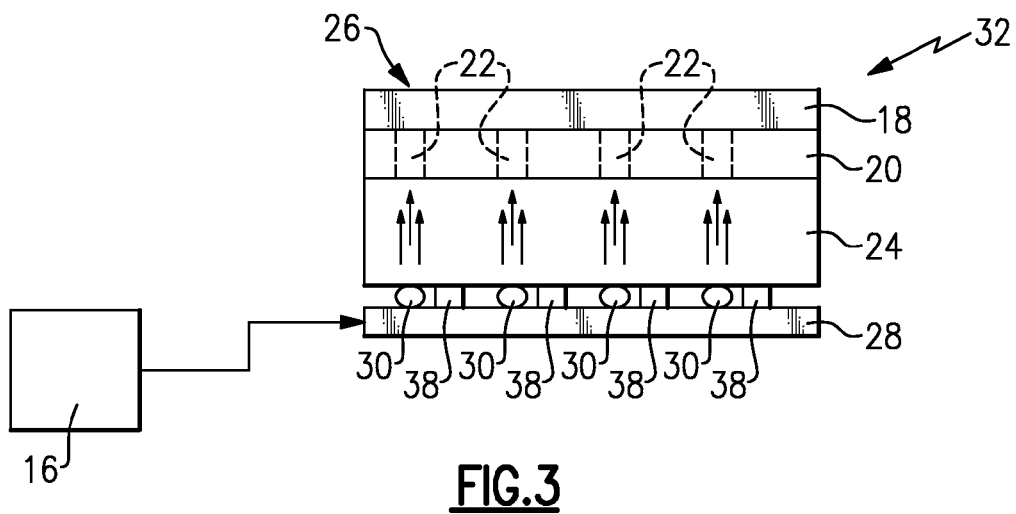
FIG. 3 is a cross-sectional view of the example switch panel assembly

Referring to FIG. 3, the multi-layer film assembly 32 includes a transparent plastic substrate 24 that supports an opaque layer 20 that includes the graphics 22 that are visible when backlit. A top layer 18 is disposed over the opaque layer 20 and provides the desired darkened appearance when the switch panel 14 is not illuminated. The top layer 18 is formed from a semi-translucent material that blocks light transmission from entering through a top surface 26, but allows light transmission from a bottom surface upwardly. As an alternative, the same effect can be achieved by placing layers 18 and 20 on the bottom side of substrate 24 rather than on the top side.

The top layer 18 is also the touch panel that is contacted to actuate a desired vehicle function. The example switches 38 comprise a plurality of sensing switching devices. The sensing switching devices actuate the corresponding feature in response to a detected pressure or proximity in a specific area. The example switches 38 comprise a plurality of capacitive sensing switches 38 that actuate the corresponding feature in response to an operator touching a corresponding area on the surface of the top layer 18. As appreciated, other switching devices, such as for example piezo switches that sense pressure along with other known switch configurations could also be utilized with the example switch panel assembly 14.

Each of the plurality of switches 38 corresponds to a graphic 22 generated in the opaque layer 20. Each graphic and switch 38 also corresponds to at least one of the plurality of light sources 30 on the PCB 28. As appreciated various configuration of LEDs 30 can be utilized to selectively illuminate those graphics 22 that correspond with an enabled vehicle function. Illumination of a select one of the light sources backlights the corresponding graphic 22 in the opaque layer 20 to highlight the area to be touched to actuate the corresponding switch 38.

The example switch panel 14 includes switches 38 and graphics 22 that correspond with all possible available features installed within the vehicle 10. However, not all variants of a particular vehicle will include all of the available features. Accordingly, the switch panel 14 is selectively controlled to illuminate only those graphics 22 that correspond to features available for that specific vehicle. In other words, the example switch panel 14 includes switches 38, graphics 22 and LEDs 30 that provide the capability to control all possible features for all variants of a particular vehicle. The vehicle controller 16 for the specific vehicle, which may or may not be onboard switch panel 14, then actuates only those LEDs 30 that correspond to features installed on that particular vehicle.

Because, the graphic symbols 22 are only visible when backlit by a corresponding LED 30, those features that are not available and not backlit are not visible to an operator. The controller 16 will determine those features installed within the vehicle and available for operation, and enable those functions in the switch panel assembly 14. The corresponding switch 38 to a non-included feature is not enabled by the vehicle controller. Selective enablement of only those switches that correspond with available features as determined and governed by the vehicle controller 16 provide for the use of single switch panel 14 for vehicles of many different variants.

Figure 4:
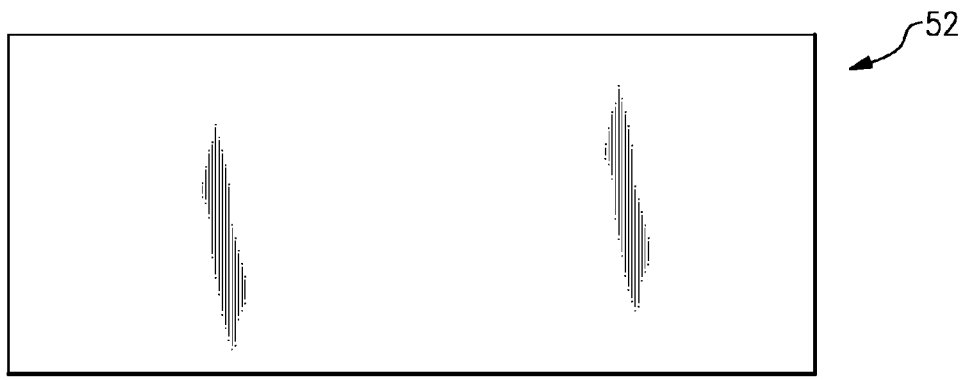
FIG. 4 is a schematic view of the example switch panel assembly in a non-illuminated condition.

Referring to FIG. 4, the switch panel 14 is shown in a non-illuminated state 52 where no graphics are visible. This state is provided by the semi-transparent top layer 18 that prevents light from exterior sources from illuminating the graphic symbols 22 (FIGS. 2, 5 and 6).

Figure 5:
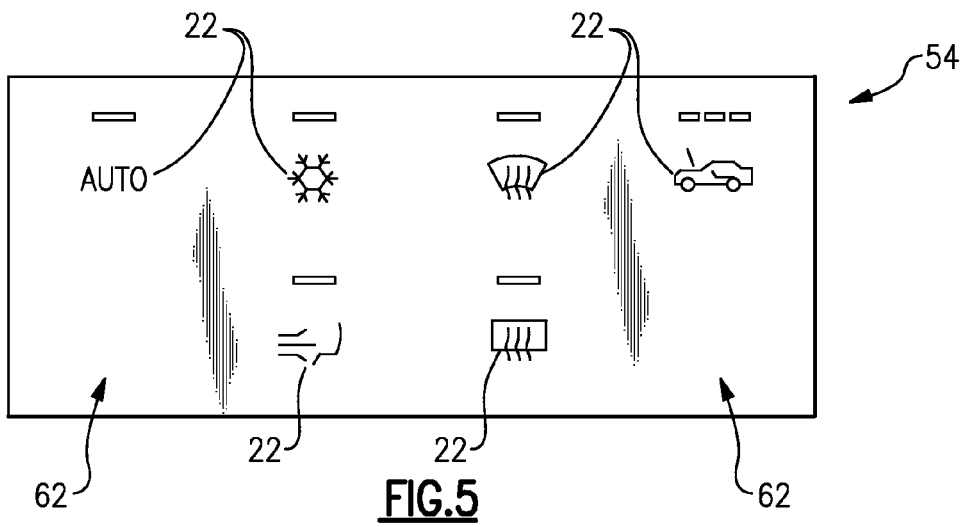
FIG. 5 is a schematic view of the example switch panel assembly illuminated for a first example variant.

Referring to FIG. 5, a first variant 54 of the switch panel 14 is shown in an illuminated backlit condition. The backlit condition illuminates those graphics 22 corresponding to enabled features. Blank spaces 62 indicate that that feature is not available. In the example illustrated in FIG. 5, the blank spaces 62 refer to an area where a seat warmer graphic and button are located. In the variant 54, the heated seat function is not available and as such is not illuminated. However, the switch assembly 14 includes the switch 30 and graphic that corresponds with this non-enabled feature. The controller 16 does not actuate the corresponding LED 30 to backlit that feature, thereby providing a desired alternate switch assembly 14 without a different physical structure.

Figure 6:
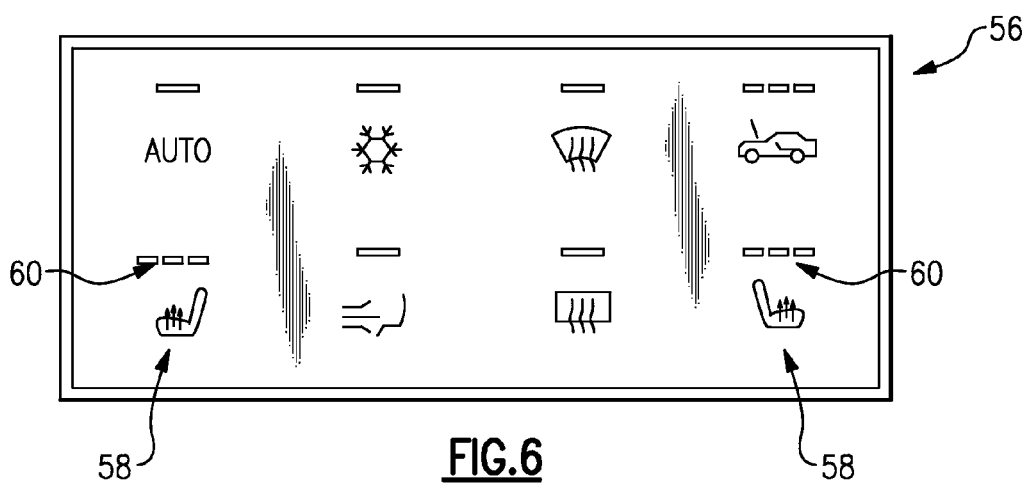
FIG. 6 is a schematic view of the example switch panel assembly illuminated for a second example variant.

Referring to FIG. 6, another variant 56 is shown and includes the graphic 58 representing the seat warming function. The illumination of the seat warming graphic 58 indicates that this function is enabled. Note that above the graphic 58 is included a power indicator 60 that illuminates to indicate a desired level of function activation. The remaining graphics 22 are as provided in the example variant 54. As appreciated, the features illustrated in the example switch panel 14 are independently enabled according to the specific variant that corresponds with available and enabled vehicle functions. The example switch panel 14 can include any number of selectively enabled switches 38 and corresponding graphics as are necessary to encompass all possible combinations of vehicle features.

Accordingly, the example switch panel assembly 14 provides a single device operable without physical modification to operate features assembled in many different combinations. Each of the individual switches 38 and corresponding LEDs 30 are selectively enabled by the vehicle controller to become visible and actuateable by a vehicle operator. The single switch panel assembly accordingly eliminates the need for differently configured switch panel assemblies for each available feature option.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A switch assembly comprising:
a first layer formed from a semi-translucent material;
a second layer covered by the first layer and including a plurality of illuminatable graphics;
a plurality of switch devices actuateable by engaging one of the illuminatable graphics;
a plurality of light sources selectively enabled for illuminating only those ones of the plurality of illuminatable graphics that corresponds to an enabled actuateable feature; and
a controller for controlling operation of the plurality of switch devices and the plurality of light sources, wherein the controller enables select ones of the plurality of switch devices and corresponding ones of the plurality of light sources responsive to a desired set of operating features.

2. The assembly as recited in claim 1, wherein the plurality of switch devices comprise at least two desired subsets of switch devices that are selectively enabled to correspond with available equipment.

3. The assembly as recited in claim 2, wherein the plurality of switch devices and the corresponding plurality of light sources correspond to a group of potential devices operable by the switch assembly and the controller enables select ones of the switch devices and the corresponding plurality of light sources that correspond with those potential devices that become available for operation.

4. The assembly as recited in claim 1, wherein a corresponding one of the plurality of illuminatable graphics is visible through the first layer responsive to actuation of a corresponding one of the plurality of light sources.

5. The assembly as recited in claim 1, wherein the plurality of illuminatable graphics comprises a plurality of symbols representing potential functions controllable by the switch assembly.

6. The assembly as recited in claim 1, wherein the plurality of switch devices comprise sensing devices that sense a touch for actuation.

7. The assembly as recited in claim 6, wherein each of the plurality of switch devices comprise a capacitive sensor.

8. A switch assembly comprising:
a first layer formed from a semi-translucent material;
a second layer covered by the first layer and including a plurality of illuminatable graphics;
a plurality of switch devices actuateable by engaging one of the illuminatable graphics, wherein the plurality of switch devices comprise at least two desired subsets of switch devices that are selectively enabled to correspond with available equipment; and
a plurality of light sources selectively enabled for illuminating only those ones of the plurality of illuminatable graphics that corresponds to an enabled actuateable feature, comprising a controller for controlling operation of the plurality of switch devices and the plurality of light sources, wherein the controller enables select ones of the plurality of switch devices and corresponding ones of the plurality of light sources responsive to a desired set of operating features.

9. A switch array assembly comprising:
a plurality of switch devices;
a plurality of graphics each corresponding with at least one of the plurality of switch devices;
a top layer disposed over the plurality of graphics;
a plurality of light sources for illuminating a corresponding one of the plurality of graphics, wherein the plurality of light sources are individually actuateable to backlight only those ones of the plurality of graphics that correspond to features enabled for operation; and
a controller for controlling operation of the plurality of switch devices and the plurality of light sources, wherein the controller enables select ones of the plurality of switch devices and corresponding ones of the plurality of light sources responsive to a desired set of operating features.

10. The assembly as recited in claim 9, wherein each of the plurality of proximity actuateable switches are independently enabled to correspond with the features enabled for operation.

11. The assembly as recited in claim 9, wherein the plurality of proximity actuateable switches comprise capacitive sensors.

12. The assembly as recited in claim 9, wherein the plurality of proximity actuateable switches comprises pressure sensors.

13. The assembly as recited in claim 9, wherein the top layer comprises a semi-transparent material that does not allow viewing of the underlying plurality of graphics when not backlit by the plurality of light sources.

14. The assembly as recited in claim 9, wherein the plurality of graphics comprise an opaque foil layer including transparent regions for the ones of the plurality of graphics that correspond to features enabled for operation.

15. The assembly as recited in claim 14, wherein the top layer and the opaque foil layer are disposed on a transparent plastic substrate.

16. A method of configuring a switch array assembly comprising:
assembling a plurality of switching devices into a common panel, wherein the plurality of switching devices includes switches for at least two different desired switch panel configurations;
assembling a plurality of light sources actuateable to illuminate a plurality of graphics corresponding to the plurality of switching devices; and
directing illumination with a controller of only those ones of the plurality of graphics that correspond to selected ones of the plurality of switching devices enabled by the controller of a desired one of the at least two different switch panel configurations.

17. The method as recited in claim 16, including the step of enabling actuation of selected ones of the plurality of switching devices that correspond to a selected one of the at least two different desired switch panel configurations.

18. The method as recited in claim 16, including hiding all of the plurality of graphics behind a semi-transparent layer when in a non-illuminated condition and revealing the selected ones of the plurality of graphics through the semi-transparent layer when in an illuminated condition.

19. The method as recited in claim 16, including the step of selecting one of the at least two different desired switch panel configurations responsive to detected available equipment within a vehicle housing the switch array assembly.

* * * * *